(12) United States Patent
Loveless

(10) Patent No.: US 8,082,219 B2
(45) Date of Patent: Dec. 20, 2011

(54) ALGORITHMIC TRADING

(75) Inventor: Jacob Loveless, New York, NY (US)

(73) Assignee: CFPH, LLC, New York, NY (US)

( * ) Notice: Subject to any disclaimer, the term of this patent is extended or adjusted under 35 U.S.C. 154(b) by 854 days.

(21) Appl. No.: 12/020,263

(22) Filed: Jan. 25, 2008

(65) Prior Publication Data

US 2008/0256013 A1 Oct. 16, 2008

Related U.S. Application Data

(60) Provisional application No. 60/886,719, filed on Jan. 26, 2007.

(51) Int. Cl.
*G06N 5/04* (2006.01)
*G06N 5/02* (2006.01)
(52) U.S. Cl. .......................................... 706/47; 706/50
(58) Field of Classification Search ...................... 706/47
See application file for complete search history.

(56) References Cited

U.S. PATENT DOCUMENTS

| | | | |
|---|---|---|---|
| 5,619,718 A | * | 4/1997 | Correa .............................. 704/9 |
| 6,782,381 B2 | | 8/2004 | Nelson et al. |
| 2004/0205018 A1 | * | 10/2004 | Degraaf et al. ................ 705/37 |

OTHER PUBLICATIONS

International Search Report and Written Opinion for International Application No. PCT/US08/52238, dated May 6, 2008 (6 pages).
U.S. Appl. No. 60/886,719, filed Jan. 26, 2007, Loveless.
International Preliminary Report on Patentability for International Application No. PCT/US08/52238, Jul. 28, 2009 (5 pages).
EPO Communication Pursuant to Rules 161 and 162 EPC for European Application No. 08714056.2, dated Sep. 10, 2009 (1 page).
Australian Exam Report for Application No. 2008207752, dated Sep. 14, 2010 (2 pages).

* cited by examiner

*Primary Examiner* — Jeffrey A Gaffin
*Assistant Examiner* — Nathan Brown, Jr.
(74) *Attorney, Agent, or Firm* — Oleg Mestechkin

(57) ABSTRACT

Systems and methods of evaluating rules. Other embodiments are also described.

36 Claims, 2 Drawing Sheets

ALGORITHMIC TRADING

CROSS-REFERENCE TO RELATED APPLICATIONS

This application claims priority to provisional application 60/886,719 filed Jan. 26, 2007 entitled ALGORITHMIC TRADING, which is hereby incorporated herein by reference.

DETAILED DESCRIPTION

Figure 1:
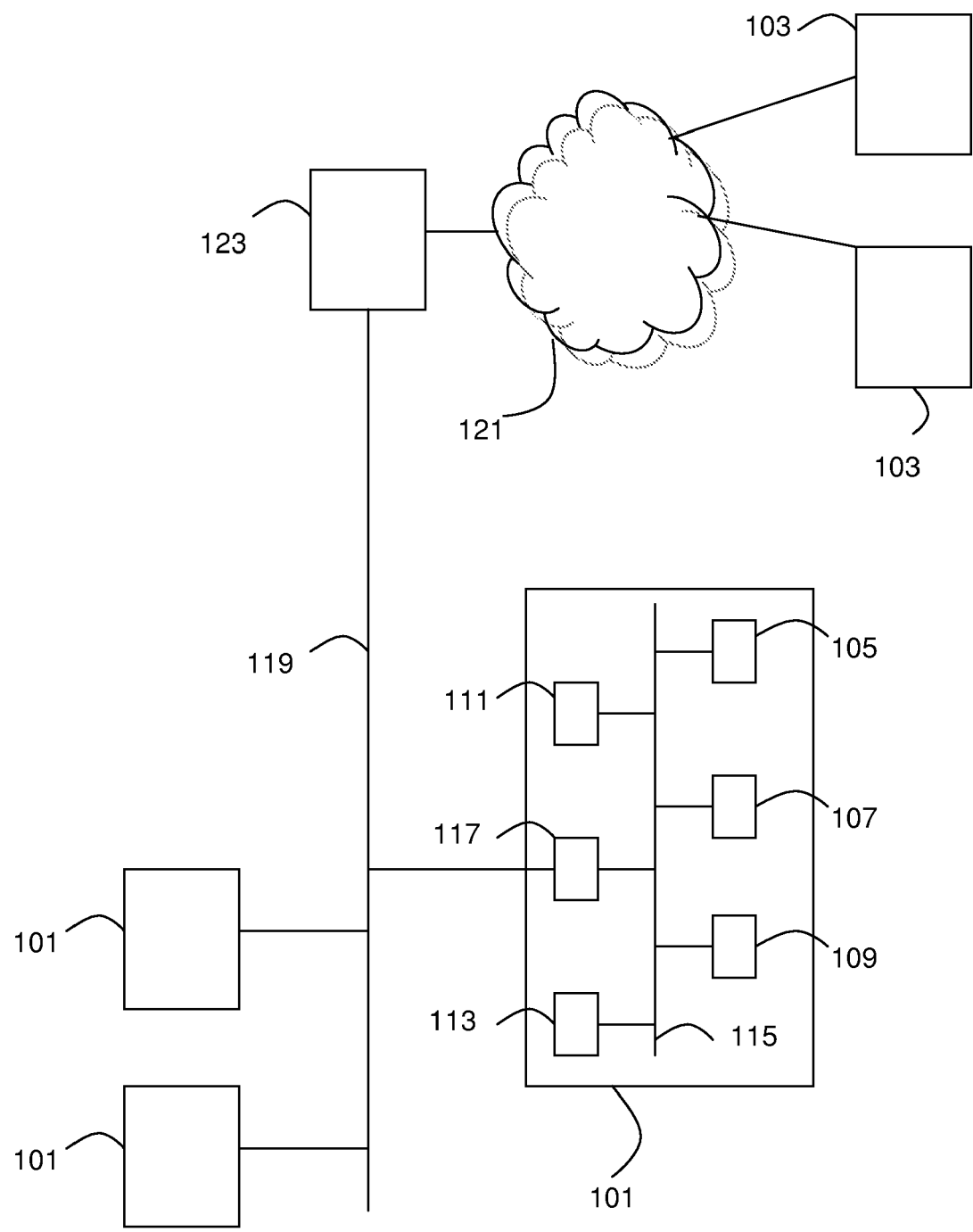
FIG. 1 illustrates an example computer system that may be used in some embodiments.

The following sections I-X provide a guide to interpreting the present application.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Interne", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology Are Not Limiting

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. §1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

All words in every claim have the broadest scope of meaning they would have been given by a person of ordinary skill in the art as of the priority date. No term used in any claim is specially defined or limited by this application except where expressly so stated either in this specification or in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substitured for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. One or more such computers or computing devices may be referred to as a computer system. FIG. 1 illustrates an example computer system. The example computer system comprises a plurality of server computers 101 and client computers 103. Typically a processor 105 (e.g., one or more microprocessors, one or more microcontrollers, one or more digital signal processors) will receive instructions (e.g., from a memory 107 or like device), and execute those instructions, thereby performing one or more processes defined by those instructions. Instructions may be embodied in, e.g., one or more computer programs, one or more scripts. It should be recognized that any computer system configured to perform any set of operations may be used in various embodiments, including, for example, trading systems, marketplaces, and so on.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks 109 and other persistent memory. Volatile media include dynamic random access memory (DRAM) 111, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

A computer system may also include one or more input/output devices 113. Such input/output devices may include monitors, keyboards, mice, and r any other desired devices.

Some computer systems may include transmission medium 115, which may be referred to as a communication network, that couples various internal components of the computer system. Such a communication network may also be referred to in some implementations as a computer bus. Some computer systems may include a specialized input/output device 117 configured to connect to an external communication network. Such a device may be referred to as a network interface. The external communication network may include a LAN 119 and/or the Internet 121. In some implementations, an edge routing device 123 may operate between a LAN and another network like the Internet 121. Such a device may include a firewall and/or any other desired security mechanism.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium®, Core, or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. §112, Paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also includes a computing device (e.g., a general purpose computer) that is programmed and/or configured with appropriate hardware to perform that function via other algorithms as would be understood by one of ordinary skill in the art.

VIII. Disclaimer

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

IX. Incorporation By Reference

Any patent, patent application or other document referred to herein is incorporated by reference into this patent application as part of the present disclosure, but only for purposes of written description in accordance with 35 U.S.C. §112, paragraph 1 and enablement in accordance with 35 U.S.C. §112, paragraph 1, and should in no way be used to limit, define, or otherwise construe any term of the present application where the present application, without such incorporation by reference, would not have failed to provide an ascertainable meaning, but rather would have allowed an ascertainable meaning for such term to be provided. Thus, the person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XI. EMBODIMENTS

Parallelism

As used herein, "parallelism" includes the degree to which an algorithm may be performed using independent processes, or sequences of steps. For example, an algorithm which requires steps 1, 2, 3, 4 may have parallelism of two if: (a) step 2 requires as input the output of step 1; (b) step 4 requires as input the output of step 3; (c) steps 1 and 2 do not require as inputs the outputs of step 3 or step 4; and (d) steps 3 and 4 do not require as inputs the outputs of step 1 or step 2. The algorithm has parallelism of two because the algorithm may be performed using two independent processes, namely steps 1 and 2 may be performed independently of steps 3 and 4.

Condition

As used herein, a "condition" may include a statement which evaluates to true or false. A condition may be comprised of an attribute, operator and value. For example "a>10" has "a" as the attribute, ">" as the operator, and "10" as the value. As used herein, a condition may include a 3-tuple of attribute, operator, and value. For example, a condition may be (a, >, 10). As used herein, a condition may include more than one attribute, more than one operator, and/or more than one value. For example, a condition may be the statement that "a is between 20 and 30". In some embodiments, conditions may include any type and number of operators.

Rule

As used herein a "rule" may include a collection of conditions.

Vector

As used herein, a "vector" may include a list of items that are all of the same type. For example, a Boolean vector may include items that are either true or false (or the equivalent).

Conditions Matrix

As used herein, a "conditions matrix" may include a matrix of conditions. Each row of a conditions matrix may define a condition. The columns of a condition matrix may describe portions of the conditions. For example, one implementation of a conditions matrix may include three columns, and the columns may include a column for an attribute, a column for a operator, and a column for a value. In some embodiments, values in a condition matrix may be grouped into operator and/or value groups.

Reference Rule

As used herein, a "reference rule" may include a mapping of portions of a condition matrix or other collection of conditions to one or more rules. For example, a reference rule may indicate one or more rows of a conditions matrix. The combination of those rows may make up a rule defined by the reference rule. In some embodiments, a reference rule may map an ordered grouping of operators and values to original rules.

Various embodiments describe algorithms for performing program trading. In various embodiments, streaming data is received. The streaming data may include data received from a market, such as a securities or futures or options market. Further, streaming data may include data that is received substantially continuously and/or data that is updated in substantially real time.

In some embodiments, the data may be used to analyze conditions. For example, a condition may be true given some values of the data, but not given others. Thus, the current values of the data may be used to determine whether a condition is currently true or not. In various embodiments, the number of conditions analyzed may be large. Further, data may change rapidly. Various embodiments include algorithms which may test a set of conditions efficiently. Various embodiments include algorithms which may test a set of rules in near O(log N) time (i.e., by performing a number of operations that is approximately proportional to log N, where N is the number of conditions in the set of rules).

Applications for such algorithms occur, for example, in financial markets where prices are electronically reported from exchange-based or over-the-counter (i.e., non-exchange based) markets substantially in real time throughout trading hours. Numerous participants may enter bids and offers, or execute transactions, nearly simultaneously. The volume of real-time information regarding such bids, offers, and transactions is viewed collectively as market data. Market participants may use various computer systems, which may be referred to as trading systems, to enter and to share information or take marketplace action. Such computer systems may include, for example, computer systems internal to a single organization, whether a single office or multiple national or international offices, which systems may interface to an electronic transaction platform or exchange based trading platform, which in turn may be linked to systems dedicated to processing and to clearing executed transactions.

One example use of rules with one or more conditions is in trading systems. Such trading systems may provide for the electronic entry of order or transaction information by human operators. Alternatively, marketplace participants may create computer programs that may analyze the market data pursuant to rules embodied in a series of algorithms, and then either take action or take no action based on the outcome of the analysis. The conditions of the rules may include, for example, market volume, security prices, market direction, a change in price, an amount of a change in price, an amount traded, an amount available for trading, prices of some recently executed trades, a time, and/or any other information. The action may take the form of submitting a bid order or a sell order, cancelling a bid order or a sell order, and/or buying or selling securities or other financial instruments.

Another example use of rules is in marketplaces and/or exchange systems. Marketplace and exchange systems may have rules of priority under which orders are given preferential treatment based on the size, or volume for purchase or sale, and or time, e.g., valid orders may preferentially be processed according to the time that they are received. It would be beneficial to create algorithms that perform analysis efficiently and rapidly, and thus position an order in its proper priority within the smallest attainable time interval. It should be realized that the distinction between trading systems, marketplaces, and exchange systems may not always exist. For example, in some embodiments, actions normally associated with a trading system may occur at a marketplace, actions normally associated with an exchange system may occur at a trading system, and so on.

Various embodiments include algorithms that may be used outside of program trading or outside of financial services. Various embodiments include algorithms that may be used to check a large number of conditions within any suitable application. For example, algorithms may be used to check measurements and warning levels within a hydro electric power plant, an automobile, an electronic device, and/or any other desired application.

Further details of example embodiments are given largely in terms of trading systems, but it should be recognized that this disclosure includes other embodiments. In some example trading related embodiments, a computer system may receive a plurality of rules. The rules may include one or more conditions and identify one or more actions that are to take place if the conditions are met. Such rules may be entered, for example, by a trader, a system operator, and/or any other desired source.

Breaking Rules into Conditions

Some embodiments may include evaluating rules at a plurality of times (e.g., as new market data is received, continuously, etc.) To understand some embodiments, consider this simple collection of example rules:

1.) a>10 and b>20 and c<5 then perform D
2.) a>3 and b>10 and c<5 then perform E
3.) a>3 and b>20 and c<10 then perform F A simple rule evaluation system might test each rule as a whole, and end either with a true or false output. Using the following example input, each of the rules would evaluate as false, and no actions would be performed:

a:11
b:24
c:17

Then in an example execution of rule 1 in which end or break statements are inserted if a condition is determined to be false might proceed as:
(Rule 1)

If a>10, Then
  If b>20,Then
    If c<5, Then
      End.

Some systems might output a vector indicating the evaluation of each condition in a rule. For example, a Boolean vector of 110b (true true false) might result from the example execution of rule 1. Such vectors may allow easy evaluations (e.g., by an operation that determines if any 0's are present in the vector) and/or may allow compact storage of the results (e.g., by using only the bits needed for storing the vector). It should be understood that the use of vectors are an example only. Other embodiments may use any other type of indication of conditions and/or rule evaluation. For example, some embodiments may output an integer for each rule and/or conditions, etc.

It should be apparent that this approach may test 3 rules, comprised of 3 conditions each for a total of 9 operations. This sequential approach has the benefit of allowing for short circuiting, e.g. (in above) if b>20 is false then c>5 would not be tested-saving the operation used to perform that test. However, in some implementations, it may be important to log all events and not short circuit. By logging all events, more complete information may be gathered regarding market conditions or other data. Greater empirical data against which to gauge future contemplated marketplace actions or algorithmic rules changes may thereby be provided.

In some embodiments, one or more preparation steps may be taken prior to rule evaluation, such as rules are entered, to improve the speed of rule evaluation. In various embodiments, an approach may include parsing rules into their conditions. For example, each of the three conditions of rules 1, 2, and 3 above may be identified. The conditions may be placed in a conditions collection such as matrix C, below. This matrix may be called the conditions matrix. In some embodiments, duplicate conditions may to be placed in the matrix. For example, the above rules may result in a condition matrix with the following entries:

$$C = \begin{array}{|c|c|c|} \hline a & > & 10 \\ \hline b & > & 20 \\ \hline c & < & 5 \\ \hline a & > & 3 \\ \hline b & > & 10 \\ \hline c & < & 10 \\ \hline \end{array}$$

In some embodiments, the original rules may be recreated from the conditions collection (e.g., the conditions matrix) by referencing particular locations of the conditions collection (e.g., rows or indices of the conditions matrix). In some embodiments, some of the original rules may be associated with references rules which indicate the rows which would recreate the original rules. For example, reference rules that might be used to define rules 1, 2, and 3 from above might be as follows:

1.) 0 and 1 and 2
2.) 3 and 4 and 2
3.) 3 and 1 and 5.

These reference rules may be interpreted during rule evaluation so that the numbers reference a row of the condition matrix which are combined in the order indicated to generate the original rules (e.g., rule 1 may be recreated by combining columns 0, 1, and 2 of matrix C). A reference rule may include any number of column indicators that may correspond to the number of conditions of an original rule. It should be understood that while the example of reference rules are given in plain English with plain number indications, in various embodiments, reference rules may include any indication(s) from which an original rule may be recreated from a condition matrix. It should further be understood that although embodiments described herein focus on a conditions matrix, any collection of conditions (e.g., a conditions list, a conditions table, a conditions database, a conditions hash, etc.) may be used in various embodiments.

Some embodiments may include evaluating reference rules to reconstruct original rules. Such evaluation may occur each time rules are evaluated, after the conditions of the conditions matrix are evaluated. Such evaluation of reference rules may take place, for example when new market data is received when rules may be tested against the market data. In some embodiments, reference rules may be evaluated using a lookup which may take a constant number of clock cycles to execute (i.e. may be performed in constant time). Such evaluation may include referencing one or more memory locations indicated by a reference rule. In some embodiments, in which multiple memory locations are referenced by a reference rule, the multiple locations may be referenced in parallel to increase speed of completing the lookup.

In some embodiments, conditions may be evaluated. The conditions may be evaluated each time the rules are to be evaluated. In some embodiments, the conditions of the rules may be evaluated before or after the reference rules are evaluated to recreate the original rules. In some embodiments, the conditions may be evaluated in the conditions matrix, or in some other collection of conditions and then the rules that allows for faster evaluation of conditions and then the rules may be reconstructed to determine which rules are satisfied and/or which actions should occur.

In some embodiments, evaluating conditions of a rule may include determining if each condition is true or false. All rules that make up the condition matrix may be evaluated by combining appropriate rows of the conditions matrix. Accordingly, in some embodiments, to evaluate all rules, all rows of the condition matrix may be evaluated and then combined according to the various reference rules. A combination of conditions that results in a collection of true conditions may trigger an action associated with a reconstructed rule.

In some embodiments, the conditions in conditions matrix may be independent of each other. Accordingly, the evaluation of the conditions may be parallelized. For example, example condition matrix C contains 6 conditions, each of which is independent of each other. Therefore, using reference rules and a condition matrix offers (in this case) 6 operations and 6 opportunities for parallelization. Compared to a traditional sequential evaluation method, the table below shows the possible savings in operations achievable from using a reference approach:

| approach | opportunity for parallel | operations per parallel | total ops |
| --- | --- | --- | --- |
| traditional, sequential | 3 | 3 | 9 |
| reference, sequential | 6 | 1 | 6 |

In general, a traditional sequential evaluation approach takes $O(N*C)$ time where N is the number of rules and C is the number of conditions per rule. In such an approach, evaluations may be performed in parallel up to the number of total rules.

In some embodiments, the reference approach takes $O(C')$ $\exists C' \subset C$ time where C' is the subset of distinct elements of C. In such an approach, evaluations may be performed in parallel up to the number of total distinct conditions of the rules. This may result in a significant performance improvement over the traditional sequential approach in particular in situations where a large number of independent conditions may be evaluated simultaneously and in situations in which a large number of rules include overlapping conditions. Accordingly, by using the conditions matrix and reference rules to evaluate rules, rule evaluation may be performed more quickly.

Testing Conditions Efficiently

In some embodiments, a condition matrix may have more or less efficient orders for testing conditions. For example, if "a>10" is true, then clearly "a>3" is also true. If a plurality of conditions include testing a same variable, then performance of the evaluation of the conditions may be improved by ordering the conditions in an efficient way. Referring again to condition matrix C, reproduced below:

$$C = \begin{array}{|c|c|c|} \hline a & < & 10 \\ \hline b & > & 20 \\ \hline c & > & 5 \\ \hline a & > & 3 \\ \hline b & > & 10 \\ \hline c & < & 10 \\ \hline \end{array}$$

In some embodiments, a preferential order to evaluating conditions may be specific within each attribute. E.g., a rule where the range for a condition with attribute "b" limits the range of a condition with attribute "a" may not be considered in the ordering of some embodiments. Therefore, in some embodiments, a condition matrix may be grouped by attributes. For example, C may be grouped as follows:

$$C(grouped) = \begin{array}{l} a \ \{< \ >\} \ \{10 \ 3\} \\ b \ \{> \ >\} \ \{20 \ 10\} \\ c \ \{> \ <\} \ \{5 \ 10\} \end{array}$$

In some embodiments, conditions may be considered as if operators within an attribute do not limit each others range. This assumption may not be true and other embodiments may be arranged to consider these limits (e.g., if a>30 is true, then a<20 is clearly false) but can be ignored for demonstration of a simple embodiment. It should be understood however, that other embodiments may consider such limiting effect to improve performance.

Accordingly, in some embodiments, conditions may be grouped by operator within their attribute groupings. For example, consider the following example conditions for attribute a:

a=73
a>17
a<53
a<71
a=83
a<77
a=81

These may be grouped by operator and attribute as follows:
a=|73 83 81
a<|53 71 77
a>|17

In some embodiments, in order to improve performance, the operator values within each operator class may be sorted in ascending order. For example, the table above may become (*'s# is used here to denote sorted ascending):
a=|'s# 73 81 83
a<|'s# 53 71 77
a>|'s#17.

Such sorting may be performed to allow the use of a desired searching algorithm. Several known searching algorithms may be used to perform a relatively fast search of sorted data. One example searching algorithm is binary search, which may be performed in O(log N) time. Another example search is an interpolation search which may be performed in O log((log N)) time.

In some embodiments, reference rules or other mapping rules may be updated or created so that the ordering of conditions and operators may be mapped back to the original rules. Such rules mapping may be performed so that lookup of the original rules may be performed in constant time whenever the rules are being evaluated. Accordingly, in some embodiments, reference rules may be used to map from a set of ordered groups of conditions values grouped by operators to the original rules.

In some embodiments, such ordering and grouping may occur prior to the evaluation of rules, such as when the rules are created. In some embodiments, evaluation of the rules may then occur many times after that, such as when market data is received, at a desired interval, constantly, etc.

In some embodiments, a desired search algorithm may be performed on the set of operator values within each group of operator class and attribute to facilitate evaluation of the rules. Such a search may be performed after the operator values are sorted to allow the use of fast searching algorithms such as the well-known binary search algorithm which operates in O(log n) time. Such a search may be performed each time the rules are to be evaluated.

In some embodiments, a binary search operator, bin, may take two parameters: X, an ordered vector of values, y, a scalar value. The results of the binary search operator may be the last index within vector X whose value is not greater than the value y. For example consider
X:6 9 17 22 36 49 53 62 71 74 77 78 81 90 93 94 95 and y:24
X bin y=3 and X@(X bin y)=22.

It should be recognized that while the described embodiments use binary search as a search operator, other searching algorithms that search ordered or unordered sets of data may be used. Some embodiments may use such an operator and/or a similar operator, or any other functions that may be able to search a set of values or an ordered set of values to provide a result of a comparison of the set of values with an input value.

Using the example bin operator, ">" operators may be evaluated by performing the binary search on the list of attribute values. Then all results after the binary search are false. Consider the example e:

a>1 2 17 47 63 72 74 86.

Searching at such time that a is equal to 21 yields 2 (value is 17). Everything at and before the 17 in the list is true and everything after the 17 is false.

Using the example bin operator, the "<" operators may be evaluated by performing the binary search on the list of attribute values. In such case, then all results after the binary search are true and all results at and before the binary search are false. Consider the example table:

a<6 9 17 22 36 49 53 62 71 74 77 78 81 90 93 94 searching at such time that a is equal to 21 yields 2 (value is 17). Everything at and before 17 is false and everything after 17 is true.

In some embodiments, evaluating an "=" operator may be performed by performing a binary search operation and comparing the value at the returned index to the value of the "=" operation. Only that value may return a true for the equal operation. All other values will be false.

This technique may result in a collection of trues and falses (e.g., a vector of 1's and 0's). These results may be recombined using the reference rules described above to recreate the original rules. Original rules that evaluate to true may result in an action being triggered. The example embodiment may result in an evaluation of rules that may be performed in near O(A*Op*log V) time where A is the number of attributes, Op is the number of operators and V is the number of values Various embodiments include algorithms which may test a set of rules in near O(log N) (i.e., by performing a number of operations that is approximately proportional to A*Op*log V). Such an embodiment may improve performance of rule evaluation, which may allow more rules to be evaluated in a shorter time. Accordingly, more rules may be used, and/or more evaluations may take place per time period so that the results of the evaluation may more accurately reflect the current market data.

Example Method

Figure 2:
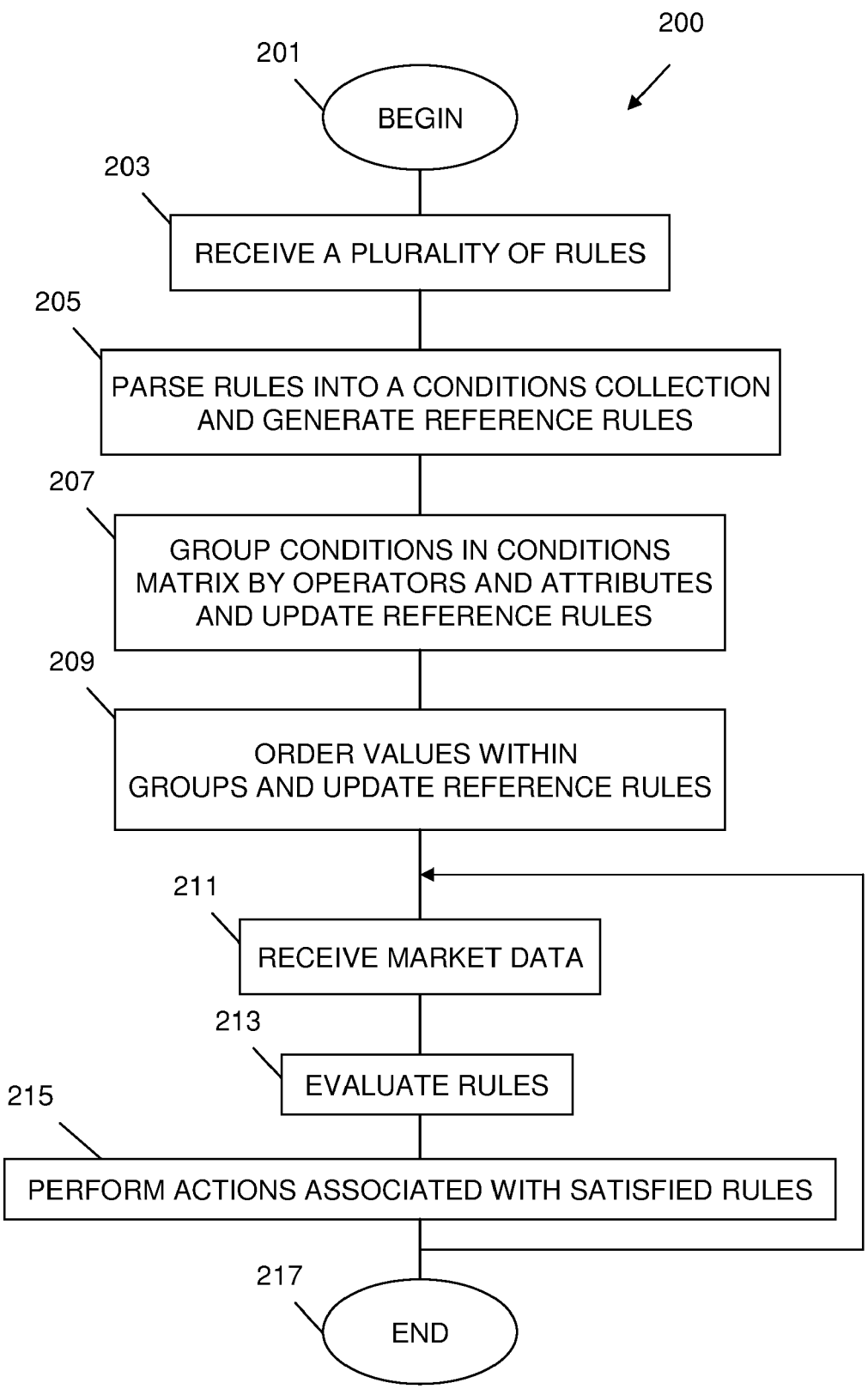
FIG. 2 illustrates an example algorithm that may be performed in some embodiments.

FIG. 2 illustrates an example process 200 that begins at block 201 and that may be performed in some embodiments. Process 200 may be performed, for example, by a computer system. It should be recognized that process 200 is given as an example only and that other embodiments may include other processes or no processes at all. In particular, some embodiments may include different steps, steps in different orders, alternative steps, additional steps, and/or fewer steps than example process 200.

As indicated at block 203, process 200 may include receiving a plurality of rules. As described above, the rules may indicate a plurality of conditions. The rules may indicate one or more actions to be taken if the conditions are true. The conditions may include the operators described above, such as x>y, a<b, c=d. The conditions ay also include any other desired operator that may be desired, some example operators may include: an absolute value operator, set operators, mathematical operators, subset operators, superset operators, intersection operators, union operators, cardinality operators, ordering operators, count operators, functions applied to data, changes in values of data, derivatives, integrals, inverting operators, alphabetical operators, and/or any other desired operator that may describe any other desired condition. In some embodiments may include mathematical and/or set operators such as, for example, x+y<z, x is within the set of the intersection of y and z, the count of elements within set x is less than y, the derivative of f(x) is greater than y, etc. Some embodiments may include conditions that are referential to other rules or conditions (e.g., rule x is true and z<y, at least one of rule x and rule y is true and no more than one of rule a, rule b, and rule c is true, etc.). The actions indicated by the rule may include any trading related actions, prioritizing actions, and/or any other desired actions. In some embodiments, conditions may be broken down into sub-conditions that include only "<" ">", and "=" operators. Such sub-conditions may be treated as normal conditions and recombined to form original conditions similar to the recombination of rules through use of mappings.

The rules may, for example, be entered by a trader developing a trading algorithm, a designer of a marketplace designing a priority scheme, and/or any other desired source. In some embodiments, an interface through which rules may be entered may be provided. In some embodiments, a computer program, such as an automatic trading program may submit rules. A trader, computer program, etc. may submit one or more rules to a computer system for evaluation.

As indicated at block 205, process 200 may include parsing the plurality of rules into a conditions collection. As described above, one example conditions collection is a conditions matrix, but any other collection of a plurality of conditions from the plurality of rules may be used in various embodiments. Also, as indicated at block 205, reference rules may be generated. The reference rules may provide a mapping between the received rules and the conditions in the conditions collection. In other embodiments, other mappings may be used to provide such references.

As indicated at block 207, process 200 may include grouping conditions in the conditions collection by operators and/or attributes. As described above, the conditions may be grouped such that similar operators and similar attributes are in a same group. Accordingly, actions, such as evaluations, searching, sorting, and so on may be performed on groups that contain same or similar operators and/or attributes. Also as indicated at block 205, reference rules may also be updated to provide an accurate mapping from the groupings to the original rules. In other embodiments, additions reference rules or other mappings may be established to allow such references.

As indicated at block 209, process 200 may include ordering the values within each group. As described below, the values may be placed in a desired numerical order for numerical values. In other embodiments any other ordering may be used (e.g., alphabetical, etc.). As described above, such ordering of groups may allow searching, evaluation, and/or any other actions to be performed more efficiently on each group. Also as indicated at block 207, reference rules may also be updated to provide an accurate mapping from the ordered groupings to the original rules. In other embodiments, additions reference rules or other mappings may be established to allow such references. In other embodiments, any mapping may be maintained in any desired way.

Actions identified at blocks 205, 207, and 209 may be considered processing of the rules into groups. In this example method, the groups are groups of conditions that have a particular attribute and a particular operator, and that are ordered by value. It should be understood that processing of rules may include any set of actions and may result in any groups, collections of conditions, and so on.

As indicated at block 211, process 200 may include receiving market data. The market data may be received from any information source, such as a news provider, etc. The information may include any information related to the activities of a market (e.g., information about prices, volumes, liquidity, sales, purchases, etc.). The information may be received over a communication network. The information may be received in discrete bundles in some embodiments. In some embodiments, the information may include a continuous flow of information reflecting ongoing activity (e.g., on going trades as they take place in a market). It should be recognized that in embodiments not related to markets and trading, the information may not include market data, but rather information that may be relevant the particular embodiments (e.g., temperatures, pressure, time, any other information). Some embodiments may include receiving one or more indications of market data. Some embodiments may include continuously receiving market data. Some embodiments may include periodically receiving market data.

As indicated at block 213, process 200 may include evaluating the rules. As described above, evaluating the rules may include performing a search (e.g., a binary search) on one or more of the groupings of ordered values to evaluate the conditions. Such searches may provide a collection of evaluated conditions (e.g., a vector of trues and falses for each grouping). The evaluated conditions may then be mapped back to the original rules using the reference rules or some other mapping technique. True and false rule may be determined by looking at remapped and evaluated conditions to determine which, if any rules are true. Some embodiments may include evaluating the rules and/or conditions as market data is received. Some embodiments may include continuously evaluating rules and/or conditions. Some embodiments may include periodically evaluating rules and/or conditions.

As indicated at block 215, process 200 may include performing actions associated with rules that are evaluated to be fulfilled by the market data. For example, for any rules that have conditions that have all been evaluated to true, an action associated with the rule may be take. In some embodiments, action execution may include providing an indication of an action to be performed. The indication may be provided to another computer program, thread, and/or system. The indication may be provided to a person through a computer display. The indication may be provided through a communication network to a remote system (e.g., to a marketplace). Some example actions may include performing actions to facilitate a notification (e.g., that the rule has been evaluated to be associated with fulfilled conditions), a sale of a financial instrument, a purchase of a financial instrument, an adjustment to an order for a purchase of a financial instrument, an adjustment to an order for a sale of a financial instrument, and so on.

As indicated in FIG. 2, process 200 may loop back to block 211 after executing rules. It should be understood that while blocks 211, 213, and 215 appear as discrete actions in the example process 200, the actions associated with these blocks may take place substantially simultaneously. For example, the market data may be constantly received in an ongoing stream while rule evaluations takes place in a continuous loop. For each rule that is evaluated to be satisfied, an action may be initiated. The action may take place as more market data is received and further rule evaluation takes place. In some embodiments, a computer system or program may be configured to parallelize the receipt of market data, the evaluation of rules, and the performance of actions (e.g., through multiple processes, threads, programs, systems, etc.). In some embodiments, the creation of new rules may also take place while rule evaluation, action performance, and/or receipt of market data is/are ongoing.

Some embodiments may not evaluate all rules and/or conditions the same number of times. For example, in some embodiments when market data is received, the market data may indicate a change in some market attributes. In some embodiments, conditions that are based on those attributes may be evaluated, but other conditions may not be. In some embodiments, such conditions may be added to a queue for evaluation. In such embodiments, conditions that are associated with unchanged market attributes may not be reevaluated thereby allowing conditions associated with changed market attributes to be more quickly evaluated.

Process 200 may end at block 217 (e.g., after trading ends for a period). It should be understood that process 200, computer systems in FIG. 1, and embodiments described herein are given as non-limiting examples only.

As mentioned above in the "Computing" section, some embodiments may include performing one or more actions using a computing device. In some embodiments, evaluation of conditions may be performed by one or more processors of a computing device. In some embodiments, such a processor may include one or more cores. Each core may be coupled to a socket. In some embodiments, a processor may include multiple sockets and each socket may be coupled to one or more cores. In some processors, the sockets may be connected by a communication network (e.g., a bus). Typically, use of a bus tends to be a relatively slow action within a processor (e.g., compared to execution of instructions by a core).

In some embodiments, evaluating conditions may be performed by the processor in such a way to reduce the use of a bus (or other communication network) coupling sockets and/or cores. For example, in some embodiments, conditions related to a particular attribute may be evaluated by the same core of a processor (core affinity) and/or by cores coupled to the same socket of a processor (socket affinity).

In other embodiments, other ways of performing any action may be used. For example, in some embodiments, specially designed hardware may be used. Such hardware may include, for example, a set of gate arrays arranged to perform the desired actions (e.g., evaluating rules). In some embodiments vector code may be used to operate a vector processor. In other embodiments, any other way of performing actions may be used.

It should be understood that although embodiments have been described with respect to trading rules and trading actions, other embodiments may include any type of actions and any type of rules desired.

Other Embodiments

The following should be interpreted as embodiments and not as claims.

A. A computer system comprising:
a processor configured to cause the computer system to:
receive a plurality of rules, in which each rule includes at least one respective condition, and in which each condition includes at least one respective attribute, at least one respective value, and at least one respective operator that describes a relationship between the at least one respective attribute and the at least one respective value,
process the plurality of rules into a plurality of groups of the conditions included in the rules, in which each group comprises conditions associated with a combination of a particular operator and a particular attribute, and in which the conditions in each group are ordered based on respective values of the conditions; and
evaluate the plurality of rules by performing at least one search operation on at least one of the plurality of groups.

A.1. The system of claim A, in which to process the plurality of rules, the processor is configured to cause the system to parse the rules into a collection of conditions that does not include duplicate conditions.

A.1.1 The system of claim A.1., in which to process the plurality of rules, the processor is configured to cause the system to form the groups of the conditions by combining portions of the collection of conditions.

A.1.2. The system of claim A.1, in which the collection of conditions includes a conditions matrix.

A.2. The system of claim A, in which the search operation includes a binary search operation.

A.3. The system of claim A, in which the search operation provides an indication of which of the conditions are true and which of the conditions are false in the plurality of groups.

A.4. The system of claim A, in which the processor is configured to cause the system to receive market data for use in evaluating the rules.

A.4.1. The system of claim A.4, in which receiving the market data includes at least one of: receiving an indication of the market data, periodically receiving indications of the market data, and continuously receiving the market data.

A.4.2. The system of claim A.4, in which evaluating the rules includes at least one of evaluating the rules as the market data is received, evaluating the rules periodically, and continuously evaluating the rules.

A.5. The system of claim A, in which the processor is configured to cause the system to maintain a mapping between conditions in the plurality of groups and conditions in the plurality of rules.

A.5.1. The system of claim A.5, in which evaluating the rules includes evaluating the conditions in the plurality of groups by performing the at least one search operation on the plurality of groups, and reconstructing the plurality of rules by combining evaluated conditions based on the mapping.

A.6. The system of claim A, in which the processor is configured to cause the computer system to perform an action associated with each rule that is associated with conditions that are evaluated to be fulfilled.

A.6.1. The system of claim A.6, in which the action includes an action facilitating at least one of a notification, a purchase of a financial instrument, a sale of a financial instrument, an adjustment of an order for a purchase of a financial instrument, and an adjustment of an order for a sale of a financial instrument.

A.7. The system of claim A, in which the processor is configured to cause the system to evaluate the plurality of rules by performing a number of operations that is approximately proportional to a number of different attributes in the rules multiplied by a number of different operators in the rules multiplied by a logarithm of a number of different values in the rules.

B. A method of operating a trading system comprising: submitting at least one trading rule to the system of claim A.

C. A method of evaluating trading rules, the method comprising:
receiving a plurality of trading rules, in which each trading rule includes at least one respective condition, and in which each condition includes at least one respective attribute, at least one respective value, and at least one respective operator that describes a relationship between the at least one respective attribute and the at least one respective value, parsing the conditions in the plurality of trading rules into a collection of conditions so that the collection of conditions does not include duplicate conditions;

maintaining a mapping from the collection of conditions to the plurality of trading rules that allows reconstruction of the plurality of trading rules from the collection of conditions;

evaluating the conditions in the collection of conditions; and evaluating the rules by referencing the evaluated conditions and the mapping.

C.1. The method of claim C, in which the collection of conditions includes a conditions matrix.

C.2. The method of claim C, in which parsing the conditions includes ordering the conditions by operator and value.

C.3. The method of claim C, further comprising receiving market data.

C.3.1. The method of claim C.3, in which evaluating the conditions includes evaluating the conditions using the market data.

C.3.2. The method of claim C.3, in which receiving the market data includes at least one of: periodically receiving the market data, continuously receiving the market data, and receiving an indication of the market data.

C.3.3. The method of claim C.3, in which evaluating the conditions includes at least one of evaluating the conditions as the market data is received, evaluating the conditions periodically, and continuously evaluating the conditions.

C.4. The method of claim C, further comprising performing an action associated with each rule that is evaluated to be have conditions that are fulfilled.

C.4.1. The method of claim C.4, in which the action includes an action facilitating at least one of a notification, a purchase of a financial instrument, a sale of a financial instrument, an adjustment of an order for a purchase of a financial instrument, and an adjustment of an order for a sale of a financial instrument.

C.5. The method of claim C, in which evaluating the conditions includes performing a number of operations that is approximately proportional to a logarithm of a number of different conditions in the rules.

What is claimed is:

1. A computer system comprising:
a processor of a financial exchange system; and
at least one memory device electronically coupled to the processor of the financial exchange system, in which the at least one memory device stores instructions which, when executed by the processor, cause the processor to:
receive a plurality of rules, in which each rule includes at least one respective condition, and in which each condition includes at least one respective attribute, at least one respective value, and at least one respective operator that describes a relationship between the at least one respective attribute and the at least one respective value,
process the plurality of rules into a plurality of groups of the conditions included in the rules, in which each group comprises conditions associated with a combination of a particular operator and a particular attribute, and in which the conditions in each group are ordered based on respective values of the particular attribute; and
evaluate the plurality of rules by performing at least one search operation on at least one of the plurality of groups; and
in response to evaluating the plurality of rules, determine that all conditions of a rule of the plurality of rules have been satisfied and perform an action comprising at least one of:
a placement of a new order to transact a financial instrument, and
an adjustment of an existing order to transact the financial instrument.

2. The system of claim 1, in which to process the plurality of rules, the processor is configured to cause the system to parse the rules into a collection of conditions that does not include duplicate conditions.

3. The system of claim 2, in which to process the plurality of rules, the processor is configured to cause the system to form the groups of the conditions by combining portions of the collection of conditions.

4. The system of claim 2, in which the collection of conditions includes a conditions matrix.

5. The system of claim 1, in which the search operation includes a binary search operation.

6. The system of claim 1, in which the search operation provides an indication of which of the conditions are true and which of the conditions are false in the plurality of groups.

7. The system of claim 1, in which the processor is configured to cause the system to receive market data for use in evaluating the rules.

8. The system of claim 7, in which receiving the market data includes at least one of: receiving an indication of the market data, periodically receiving indications of the market data, and continuously receiving the market data.

9. The system of claim 7, in which evaluating the rules includes at least one of evaluating the rules as the market data is received, evaluating the rules periodically, and continuously evaluating the rules.

10. The system of claim 1, in which the processor is configured to cause the system to maintain a mapping between conditions in the plurality of groups and conditions in the plurality of rules.

11. The system of claim 10, in which evaluating the rules includes evaluating the conditions in the plurality of groups by performing the at least one search operation on the plurality of groups, and reconstructing the plurality of rules by combining evaluated conditions based on the mapping.

12. The system of claim 1, in which the processor is configured to cause the system to evaluate the plurality of rules by performing a number of operations that is approximately proportional to a number of different attributes in the rules multiplied by a number of different operators in the rules multiplied by a logarithm of a number of different values in the rules.

13. A method of operating a trading system comprising:
submitting at least one trading rule to the system of claim 1.

14. A method comprising:
receiving, by a processor of a financial exchange system, a plurality of trading rules, in which each trading rule includes at least one respective condition, and in which each condition includes at least one respective attribute, at least one respective value, and at least one respective operator that describes a relationship between the at least one respective attribute and the at least one respective value,
parsing, by the processor of the financial exchange system, the conditions in the plurality of trading rules into a collection of conditions so that the collection of conditions does not include duplicate conditions;

maintaining, by the processor of the financial exchange system, a mapping from the collection of conditions to the plurality of trading rules that allows reconstruction of the plurality of trading rules from the collection of conditions;

evaluating, by the processor of the financial exchange system, the conditions in the collection of conditions;

evaluating, by the processor of the financial exchange system, the rules by referencing the evaluated conditions and the mapping; and in response to evaluating the plurality of rules, determine that all conditions of a rule of the plurality of rules have been satisfied and performing, by the processor of the financial exchange system, an action comprising at least one of:

placing of a new order to transact a financial instrument, and adjusting of an existing order to transact the financial instrument.

15. The method of claim 14, in which the collection of conditions includes a conditions matrix.

16. The method of claim 14, in which parsing the conditions includes ordering, by the processor of the financial exchange system, the conditions by operator and value.

17. The method of claim 14, further comprising receiving market data.

18. The method of claim 17, in which evaluating the conditions includes evaluating the conditions using the market data.

19. The method of claim 17, in which receiving the market data includes at least one of: periodically receiving the market data, continuously receiving the market data, and receiving an indication of the market data.

20. The method of claim 17, in which evaluating the conditions includes at least one of evaluating the conditions as the market data is received, evaluating the conditions periodically, and continuously evaluating the conditions.

21. The method of claim 14, further comprising performing, by the processor, an action associated with each rule that is evaluated to be have conditions that are fulfilled.

22. The method of claim 21, in which the action includes an action facilitating at least one of a notification, a purchase of a financial instrument, a sale of a financial instrument, an adjustment of an order for a purchase of a financial instrument, and an adjustment of an order for a sale of a financial instrument.

23. The method of claim 14, in which evaluating the conditions includes performing, by the processor of the financial exchange system, a number of operations that is approximately proportional to a logarithm of a number of different conditions in the rules.

24. The system of claim 1, wherein the action includes the adjustment of the existing order.

25. The system of claim 24, wherein the adjustment comprises an adjustment of a quantity of the existing order.

26. The system of claim 24, wherein the adjustment comprises an adjustment of a price of the existing order.

27. The system of claim 1, wherein processing of the plurality of rules includes ordering the conditions in a group based on values of a respective attribute such that the group includes an ordered set of values of the respective attribute.

28. The system of claim 4, wherein the conditions matrix comprises at least one row and at least one column, wherein each row defines a condition, and wherein each column comprises a portion of the condition.

29. The system of claim 28, wherein the portion of the condition comprises one of:
an attribute;
a value; and;
an operator.

30. The system of claim 5, wherein the binary search operation comprises a search operator which compares at least one scalar value to at least one particular value of at least one group to determine whether the particular value satisfy the comparison.

31. The system of claim 30, in which the binary search operation comprises determining that one first value of one first group satisfies the comparison, and in response to determining that the one first value satisfies the comparison, determining that all values in one particular direction of the ordering of the first group satisfy the comparison.

32. The system of claim 6, wherein the processor is further configured to cause the computer system to:
determine which rules of the plurality of rules have been satisfied based on the indication of which conditions are true and which conditions are false, wherein determining which rules are satisfied includes determining that the rule is satisfied.

33. The system of claim 11, wherein reconstructing the plurality of rules comprises recreating the plurality of rules based on the conditions matrix and the mapping by referencing respective combinations of locations of the conditions matrix identified by the mapping.

34. The system of claim 1, wherein the action includes the placement of the new order.

35. The system of claim 1, wherein the rule identifies the action.

36. The system of claim 1, in which to process the plurality of rules, the processor is configured to cause the system to:
receive market data for use in evaluating the rules, wherein the rule identifies the action, wherein a first action includes the placement of the new order, and wherein a second action includes the adjustment of the existing order;
parse the rules into a collection of conditions that does not include duplicate conditions, wherein the collection of conditions comprises at least one row and at least one column, wherein each row defines a condition, wherein each column comprises a portion of the condition, and wherein the portion of the condition comprises one of: an attribute, a value, and an operator;
ordering the conditions in a group based on values of a respective attribute such that the group includes an ordered set of values of the respective attribute;
maintain a mapping between conditions in the plurality of groups and conditions in the plurality of rules;
evaluate the plurality of rules by performing a number of operations that is approximately proportional to a number of different attributes in the rules multiplied by a number of different operators in the rules multiplied by a logarithm of a number of different values in the rules; in which the search operation includes a binary search operation; wherein the search operation provides an indication of which of the conditions are true and which of the conditions are false in the plurality of groups; wherein the binary search operation comprises a search operator which compares at least one scalar value to at least one particular value of at least one group to determine whether the particular value satisfy the comparison; and wherein the binary search operation comprises determining that one first value of one first group satisfies the comparison, and in response to determining that the one first value satisfies the comparison, determining that all values in one particular direction of the ordering of the first group satisfy the comparison; and determine which rules of the plurality of rules have been satisfied based on the indication of which conditions are true and which conditions are false, wherein determining which rules are satisfied includes determining that the rule is satisfied.

* * * * *